United States Patent [19]

Blosser et al.

[11] 4,447,385
[45] May 8, 1984

[54] TIRE PRESS, LOADER AND METHOD

[75] Inventors: Virgil Y. Blosser; G. E. Isaksson, both of Canfield; Dallas B. Rupp, Lisbon; A. P. Singh, Youngstown, all of Ohio

[73] Assignee: NRM Corporation, Akron, Ohio

[21] Appl. No.: 519,072

[22] Filed: Aug. 1, 1983

[51] Int. Cl.³ ............................................... B29H 5/02
[52] U.S. Cl. ..................................... 264/315; 425/38
[58] Field of Search ............... 264/315; 425/38, 28 R, 425/58, 36, 32

[56] References Cited

U.S. PATENT DOCUMENTS

| | | | |
|---|---|---|---|
| Re. 27,060 | 2/1971 | Balle et al. | 425/38 X |
| 3,267,515 | 8/1966 | Ulm | 425/38 X |
| 3,378,882 | 4/1968 | Turk et al. | 425/38 |
| 3,380,115 | 4/1968 | Soderquist | 425/38 |
| 3,530,533 | 9/1970 | Turk et al. | 425/38 X |
| 3,579,736 | 5/1971 | Balle et al. | 425/38 |
| 3,609,812 | 10/1971 | Baier | 425/38 |
| 3,712,769 | 1/1973 | Cimprich | 425/38 X |
| 3,794,457 | 2/1974 | Gazuit | 425/38 X |
| 3,917,791 | 11/1975 | Kratochvil et al. | 425/32 |
| 4,029,449 | 6/1977 | Longaberger | 425/36 X |
| 4,045,150 | 8/1977 | Gazuit | 425/38 X |
| 4,190,406 | 2/1980 | Geck et al. | 425/38 |
| 4,236,883 | 12/1980 | Turk et al. | 425/38 X |
| 4,279,438 | 7/1981 | Singh | 425/38 X |
| 4,338,069 | 7/1982 | Singh et al. | 425/38 X |
| 4,390,334 | 6/1983 | Singh et al. | 425/28 R |
| 4,395,209 | 7/1983 | Singh et al. | 425/38 X |

*Primary Examiner*—J. Howard Flint, Jr.

*Attorney, Agent, or Firm*—Maky, Renner, Otto & Boisselle

[57] ABSTRACT

A tire press, loader and method wherein a green tire is positioned by the loader between vertically separated mold sections and then engaged and held at the top bead thereof in registered contact with an upper bead ring of the press mold by a green tire bead elevator in the press head. While such registered contact is maintained, the upper bead ring and bead elevator raise and hold the green tire to the upper mold section as the loader axially clears the green tire and withdraws from the press. After such transfer of the green tire to the press head, the press partially closes to bring the bottom bead of the green tire against the lower bead ring of the press mold for subsequent shaping of the green tire and final closure of the press. The bead elevator includes a radially expandable chuck mounted for vertical movement in the press head which operates, when expanded, to engage and move the top bead of the green tire into registered or fully seated contact with the upper bead ring. The loader employed to introduce the green tire into the press includes a relatively narrow fluid expandable ring grip for substantially continuously gripping the outside of the tread leaving both bead areas free for centering, register and seating during the loading, seating and shaping process. The loader also has the facility for elevating the green tire into contact with the upper bead ring once in axial alignment with the mold sections and for removing a cured tire from the lower bead ring after transfer of the green tire to the press head.

39 Claims, 35 Drawing Figures

TIRE PRESS, LOADER AND METHOD

The present invention relates in general to tire presses and related methods, and in particular to tire presses which utilize automatic loading and unloading mechanisms and methods for introducing a green tire (uncured tire carcus) into the press for subsequent bladder shaping and cure of the tire, and for removing a cured tire from the press.

BACKGROUND

Automatic tire loading mechanisms or loaders have been employed in connection with the introduction of green tires into the tire molds or cavities of tire presses. Perhaps the most common type of loader employed today is that which picks up a green tire by the top bead thereof from a loading stand in front of the press and then horizontally shifts the green tire into axial alignment with the lower mold section of the press and, in some instances, also with the upper mold section. Some loaders of this general type then would deposit the green tire onto the lower mold section as by placement or dropping and, thereafter, would move clear of the press for subsequent bladder insertion and shaping of the green tire and press closure, whereas other loaders would continue to hold the green tire during the bladder insertion and initial shaping operation and then move clear of the press to permit press closure.

Examples of tire loaders of the foregoing general type can be seen in Ulm et al U.S. Pat. No. 3,584,335, Barton U.S. Pat. No. 3,924,983, Nakagawa et al U.S. Pat. No. 4,035,117 and Yuhas et al U.S. Pat. No. 4,092,090. The loaders illustrated in these patents generally constitute press attachments, whereas in Turk et al U.S. Pat. Nos. 3,350,533 and 3,378,882, loaders employing expandable plate-type or finger chucks are built into the movable upper half or head of the press. While having advantages over other press loader arrangements, the latter arrangement is relatively energy inefficient since the entire press head must be shuttled laterally between the pick-up and load positions. This would be of greater consequence in connection with the loading and curing of large tires such as truck tires, and the correspondingly larger and heavier press heads. Also, the lateral shuttling of such larger and heavier press heads may present significant alignment and wear problems.

Tire press loaders also are known to pick up a green tire by the tread thereof rather than by the top bead. An example of this general type of loader can be seen in Getz U.S. Pat. No. 3,790,656. Where outside or basket loaders have been employed, such devices usually comprise vertically elongated and heavy shoes which tend to distort the tire and which are not suitable for placement between axially separated mold sections.

One problem encountered heretofore with known loaders and presses and associated methods has been the inability to load efficiently, automatically and repeatedly the green tires into the press with assurance that the green tire is properly located in the press before and during bladder insertion and shaping. The problem at least partly stems from the fact that the sidewalls of preshaped green tires may be quite flexible and may also become dimensionally distorted in storage while awaiting cure. Since most automatic loaders used today pick up the green tire by the top head thereof, there is no assurance that other portions of the green tire will be in a known or given location relative to the bladder before and during insertion. Moreover, the green tire may be pushed off center by the bladder as the bladder is inserted into the green tire. As a result, there is the likelihood of asymmetrical positioning of the green tire in relation to the bladder and press mold. This problem is of even greater consequence in connection with the loading of large tires such as truck tires.

Another and related concern associated with tire press loaders and press loading methods, regardless of type of loader employed, has been the need to insure proper positioning and seating of the green tire beads on respective bead seats or rings provided in or in conjunction with the upper and lower mold sections of the press. For the most part, common practice in presses employing shaping and curing bladders has been to use the bladder to effect final seating of the green tire beads. As shown in Gazuit U.S. Pat. No. 3,837,770, for example, the top and bottom beads of the green tire, prior to bladder inflation and manipulation, are relatively loosely supported by the respective bead seats of the press mold in the then substantially closed press. When the bladder is inflated into the green tire, the beads are finally seated by the bladder on the bead seats.

One problem with this common practice is that any existing asymmetry between the bladder, green tire beads and bead seats or rings during bead seating may result in bead kinks or otherwise improper positioning or seating of the beads. Even if full seating of the beads is achieved, any correction of misalignment existing prior to bladder shaping may result in the inducement of irregular assymetrical molding stresses in the bead area of the tire after final shaping and cure. These problems are of even greater concern when loading preshaped tires which, as above indicated, may have relatively flimsy sidewalls that may become dimensionally distorted in shape while awaiting cure, this increasing the likelihood of assymetrical positioning of the green tire beads in relation to the bladder and the bead rings or seats.

Several attempts have been made to achieve proper positioning and seating of at least one of the green tire beads. One attempt is disclosed in Gazuit U.S. Pat. No. 3,794,457 wherein a small tubular, inflatable bladder is used to seat the bottom tire bead of the green tire against the lower bead ring of a press prior to tire shaping by the shaping and curing bladder. When not in use such as during tire cure, the bead positioning device is telescoped into or housed in a well in the lower half of the press. As disclosed in such patent, the bead positioning and centering device may be associated with the upper mold of the press and used for positioning and centering the top bead of the tire around the upper bead ring of the press.

Another attempt toward solution of the bead positioning problem is disclosed in Gazuit U.S. Pat. No. 4,045,150 wherein a top bead positioning device employs a circular set of radially expandable segments or fingers to center the top bead of the green tire to the upper bead ring. Such a device is somewhat of an offshoot of the loader/press combination disclosed in the aforementioned Turk et al U.S. Pat. No. 3,378,882, although the green tire is first placed on the lower mold portion of the press as by an automatic loader and then the upper mold portion lowered for subsequent operation of the positioning device. In either arrangement, final seating of the top bead of the green tire is effected by the shaping and curing bladder, such being inserted into the green tire and inflated to push the top bead of the green tire onto the upper bead ring.

Presses of the bladderless type, by their nature, do not effect bead seating by means of a shaping and curing bladder. Instead, final seating of the beads may be effected by bead clamps employed in these presses and to some extent by the admission of pressurized air into the tire for initial shaping thereof. Also, in the retreading art, direct application of air pressure to the tire may be employed at least in part for bead seating. Examples of a bladderless press and retread machine can be seen in Turk et al U.S. Pat. No. 4,236,883 and Barefoot U.S. Pat. No. 3,816,217, respectively. Moreover, it is common practice directly to inflate cured tires installed on rims and the like such as during post-cure inflation or in connection with final use applications.

Automatic tire unloading mechanisms or unloaders also have been employed to effect removal of cured tires from tire presses. Typically, such unloaders operate to remove the cured tires to the rear of the presses while green tires are loaded from the front of the presses. Examples of known unloaders can be seen in Singh U.S. Pat. No. 4,170,442 and Singh et al U.S. Pat. No. 4,332,536. The unloader also may be built into the movable head of the press as seen in Yuhas U.S. Pat. No. 4,092,090.

SUMMARY OF THE INVENTION

In general, the present invention constitutes certain improvements in the press loading and shaping process shown and described in the noted Turk et al U.S. Pat. No. 3,378,882, as well as certain improvements in the press shown and described in Singh et al U.S. Pat. No. 4,332,536. A tire press, loader and method according to the present invention provides for efficient introduction of green tires into a press and mold cavity and proper positioning of the green tire beads in the press through a process of green tire positioning, transfer and locating.

As set forth herein, the green tire is positioned by the loader between vertically separated mold sections and then engaged and held at the top bead thereof by a green tire bead elevator in registered contact with an upper bead ring or seat of the press mold. While such registered contact is maintained, the upper bead ring and bead elevator raise and hold the green tire to the upper mold section as the loader axially clears the green tire and withdraws from the press. After such transfer of the green tire to the press head, the press partially closes to bring the bottom bead of the green tire against the lower bead ring or seat of the press mold for subsequent shaping of the green tire and final closure of the press for cure.

In one embodiment of the invention, the aforementioned bead elevator includes a bladder chuck which is characterized by a small fluid expandable tubular annulus or bladder operative upon expansion to distend radially outwardly to provide a resilient shelf for engaging the axially inner side of the top bead of the green tire. The bladder chuck and upper bead ring of the press mold are mounted for common as well as independent vertical movement in the movable upper half or head of the press. The bladder chuck operates, when expanded, to engage an move the top bead of the green tire into registered or fully seated contact with the upper bead ring either by reason of such expansion and/or by relative axial movement between the chuck and upper bead ring. When the bladder chuck is fully retracted into the press head when not in use such as during bladder shaping and tire cure, the bladder thereof is stored out of the way in a storage area in the press head.

During the loading operation, the bladder chuck and upper bead ring are telescoped downwardly out of the press head and the bladder chuck further lowered to position the bladder thereof just below the top bead of the green tire which is held at the tread thereof by the loader. The bladder then is expanded and moved axially as needed to engage the underside of the top bead and move such top bead upwardly into registered contact with the upper bead ring. While such registered contact is maintained, the green tire is released from the loader and raised to the upper mold section in the press head by uniform upward movement of the bladder chuck and upper bead ring. After such transfer of the green tire to the press head, the press is partially closed to bring the bottom bead of the green tire into engagement with the lower bead ring, which may be elevated above or registered in the lower press mold section, for subsequent bladder insertion and shaping of the green tire. As will be seen, the bladder chuck may be used to effect full seating of the top bead of the green tire on the upper bead ring prior to insertion of the shaping and curing bladder.

Also contemplated is another form of green tire bead elevator which may have particular application, for example, in presses of the bladder-in-well type. Such form of elevator includes a radially expandable mechanical chuck mounted for vertical movement in the press head. Such chuck consists in part of a plurality of circumferentially arranged sector plates or fingers which are actuated upon axial movement of the bladder ram of the press. After a green tire has been loaded onto the lower bead ring or seat of the press or is held by the loader above and in axial alignment with the bottom bead ring, the press is partially closed and the elevator chuck lowered down into the green tire. The sector plates are then expanded and the elevator chuck moved upwardly to engage and move the top bead of the green tire into registered or fully seated contact with the upper bead ring or seat of the press mold. While such contact is maintained, the bottom bead of the green tire is positioned against the lower bead ring for subsequent shaping of the green tire and final closure of the press.

Still in accordance with the invention, the loader employed to introduce green tires into the press mold cavity includes a relatively narrow fluid expandable ring for substantially continuously gripping the outside of the tread of a green tire leaving both tire bead areas free for centering, register and seating during the loading, seating and shaping process. The ring grip includes a fluid expandable tubular annulus or bladder secured interiorly of an annular support ring by circumferentially arranged fittings which additionally provide for introduction of pressurized fluid such as air into the bladder. On its radially inner side, the annular tubular bladder is provided with an annular array of gripping blocks which, when the bladder is contracted, have an inner diameter sufficient to permit telescopic positioning thereof around the tread of the green tire. When thusly positioned, the bladder is expanded to move the gripping blocks radially inwardly thereby to grip and hold the green tire tread axially centered in the ring grip for subsequent positioning of the green tire in the press. The ring grip is mounted on an elevator which has facility for raising the green tire into contact with the upper bead ring or seat of the press mold once in axial alignment with the mold sections.

Further in accordance with the invention, such loader may also operate as an unloader to effect removal of a cured tire from the press in sequence with the green tire loading operation. After transfer of the green tire to the press head, the ring grip may be axially lowered about a cured tire supported on lower bead seat and expanded to grip the cured tire. The lower bead seat then is lowered or the ring grip elevated to permit lateral withdrawal of the cured tire from the press.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIGS. 7A and 7B are further enlarged, fragmentary vertical sections taken substantially along the same line as FIG. 6;

FIG. 8 is an enlarged fragmentary vertical section through the press cavity of FIG. 5 taken substantially along the line 8—8 thereof;

DETAILED DESCRIPTON

I. General Construction of the Press

Figure 1:
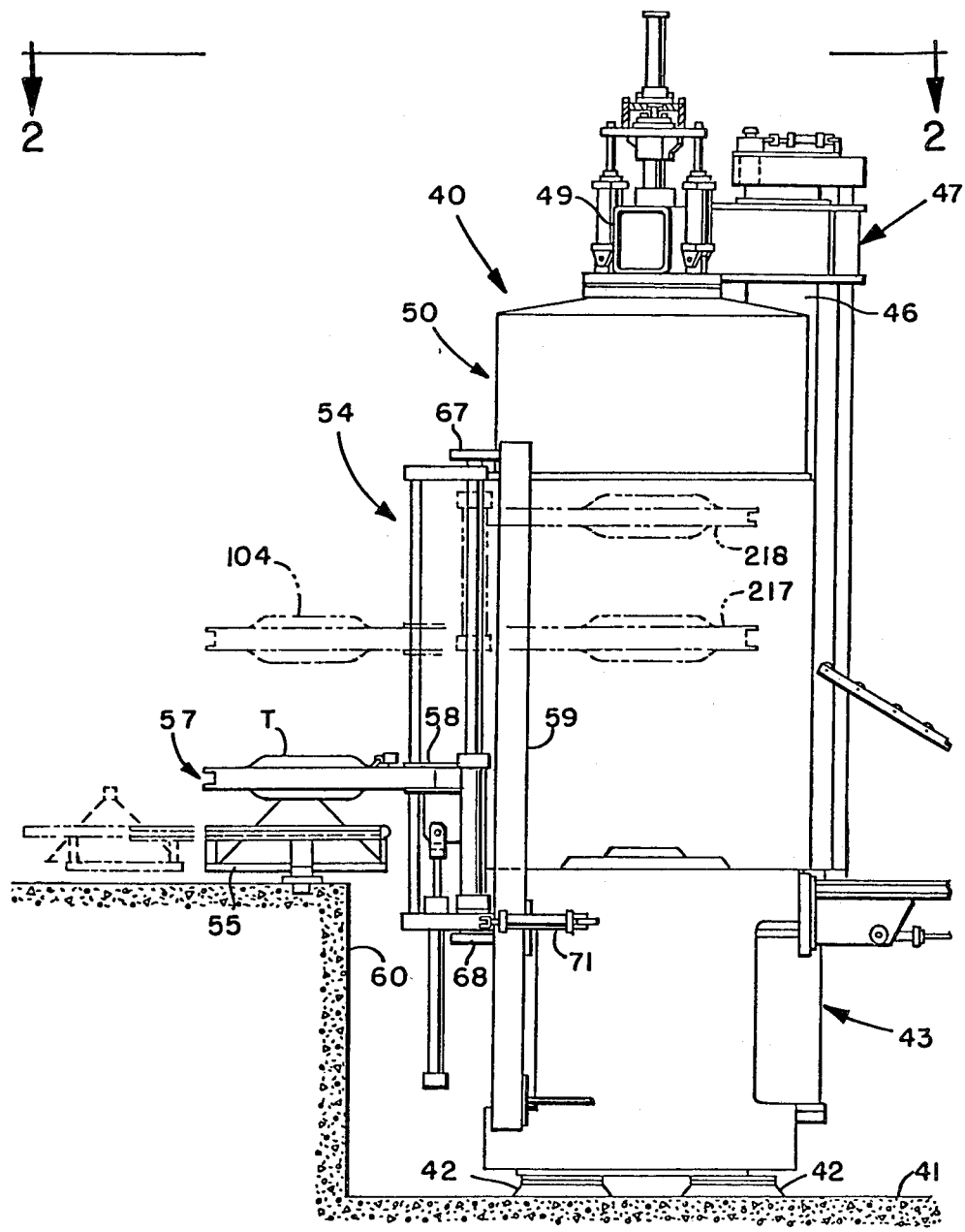
FIG. 1 is a side elevation view of a dual cavity tire press and tire loader assembly according to the present invention with the press being shown open.
Figure 2:
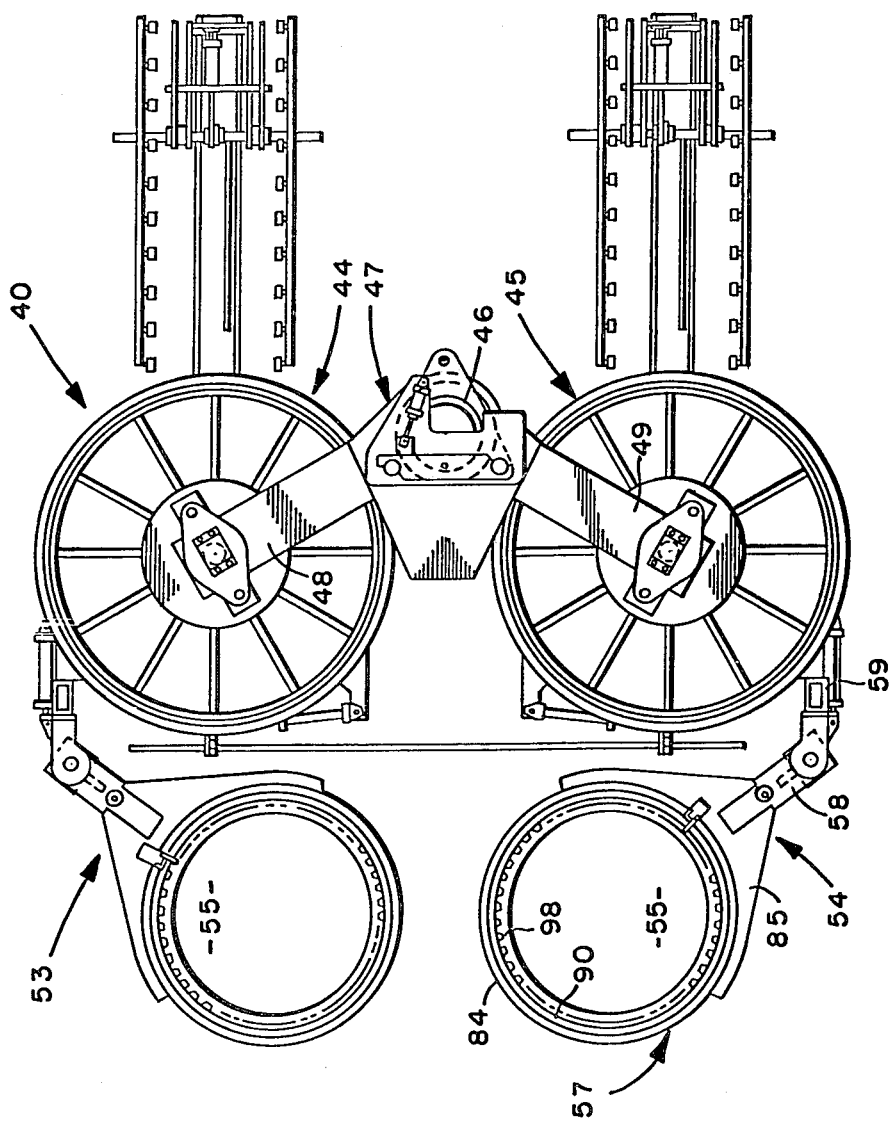
FIG. 2 is a top plan view of the press and loader assembly as seen from the line 2—2 of FIG. 1.

Referring first to FIGS. 1 and 2 of the drawings, a dual cavity tire press particularly suited for shaping and curing large tires such as truck tires is designated generally by reference numeral 40. The press 40 is mounted on the floor 41 by footers 42 secured to the underside of the bottom half 43 of each press cavity 44, 45. The bottom halves 43 of the cavities 44 and 45 are side-by-side and together support therebetween a vertical column or post 46. Mounted on the vertical column 46 for guided sliding vertical movement is a horizontal, V-shape beam or yoke 47 which has opposite arms 48 and 49 projecting over the mold cavities 44 and 45, respectively. Each arm 48, 49 supports therebeneath at its distal end and a respective top half or head 50 of each press cavity 44, 45 in vertical alignment with the corresponding bottom half 43. Although not shown, a long stroke piston-cylinder assembly is connected between the yoke 47 and each bottom half 43 which, upon actuation, effects vertical movement of the yoke along the vertical column 46 and accordingly vertical movement of the press heads 50 for opening and closing the press.

For the most part, the press 40 is of the type collectively shown in U.S. Pat. No. 4,332,536, issued June 1, 1982 and entitled "Hydraulic Tire Press", and U.S. Pat. No. 4,338,069, issued July 6, 1982 and entitled "Tire Press". It should, however, be appreciated that the principles of this invention may be used in connection with other types of presses as well, two examples of which are discussed hereinafter. In particular, the principles of the invention have particular application in presses of the straight up and down type, but also may find application in presses of the slide back or tilt back type which have press heads which move laterally or pivot and then move vertically during closing of the press. The presses further may be of the post-in-well and bladder-in-well types.

II. The Loaders

Still referring to FIGS. 1 and 2, the cavities 44 and 45 of the press 40 respectively have loaders 53 and 54 associated therewith. Each loader 53, 54 is operative to pick up a green tire T from a respective loader stand 55 in front of the press and introduce such green tire into the respective press cavity 44, 45. Since the loaders 53 and 54 essentially are of like construction, only the loader 54 will be described in greater detail. It however will be appreciated that the following description is equally applicable to the other loader 53 except to the extent that the loaders are oppositely orientated with respect to the vertical plane of symmetry of the press 40.

The loader 54 is of the swing-arm type and includes a fluid expandable ring grip 57 which extends horizontally from the distal end of a horizontal loader arm 58 mounted on a vertical loader stanchion or column 59 or vertical and horizontal swinging movement. The loader stanchion 59 may be conveniently mounted on the side of the respective lower half or base 43 of the press 40 as shown or independently mounted such as on the sidewall of the raised floor or platform 60 which supports the loader stand 55 approximately at the level of the mold cavity in the press.

Figure 3:
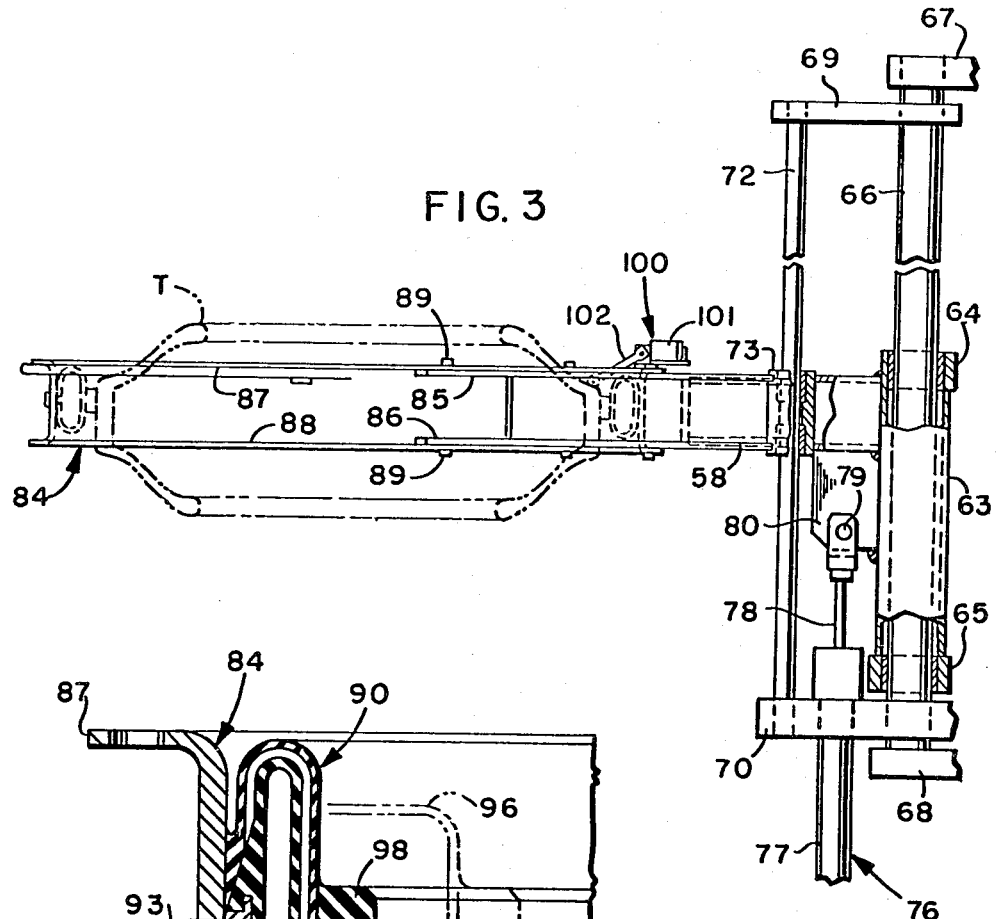
FIG. 3 is an enlarged elevation view, partly broken away and in section, of the tire loader seen in FIGS. 1 and 2.

With additional reference to FIG. 3, the loader arm 58 can be seen to be mounted at the top of a vertically extending elevator tube 63 which interconnects vertically spaced side blocks 64 and 65 that are mounted for vertical sliding movement on a pivot shaft 66. The pivot shaft 66 is journalled top and bottom between brackets 67 and 68 on the stanchion 59 and has top and bottom plates 69 and 70 keyed thereto for common pivotal movement, such pivotal movement being effected by a horizontal piston-cylinder assembly 71 pivotally connected at opposite ends to the bottom pivot plate 70 and stanchion 59. Retained between projecting ends of the pivot plates 69 and 70 is a guide 72 which is spaced from and parallel to the pivot shaft 66. The guide rod 72 extends through a bushing assembly 73 in the loader arm 58 and accordingly causes the loader arm to pivot commonly with the pivot plates 69 and 70 and pivot shaft 66. When the piston-cylinder assembly 71 is retracted, the loader arm 58 is swung to its solid line position in FIG. 2 to position the ring grip 57 axially in line with the loader stand 55. On the other hand, extension of the piston-cylinder assembly swings the ring grip to a load position in axial alignment with the mold cavity 45 of the press 40.

As indicated above, the loader arm 58 is vertically movable, such movement being effected by a vertical piston-cylinder assembly 76. The cylinder 77 of the assembly 76 is mounted at its rod end on the bottom pivot plate 70 whereas the piston rod 78 thereof is clevis connected at 79 to a gusset 80 secured to the underside of the loader arm 58 and adjacent side of the elevator tube 63. Accordingly, extension of the piston-cylinder assembly 76 will move the loader arm and thus the ring grip 57 vertically upwardly along the pivot shaft 66 and guide shaft 72 whereas retraction will lower the ring grip.

Figure 4:
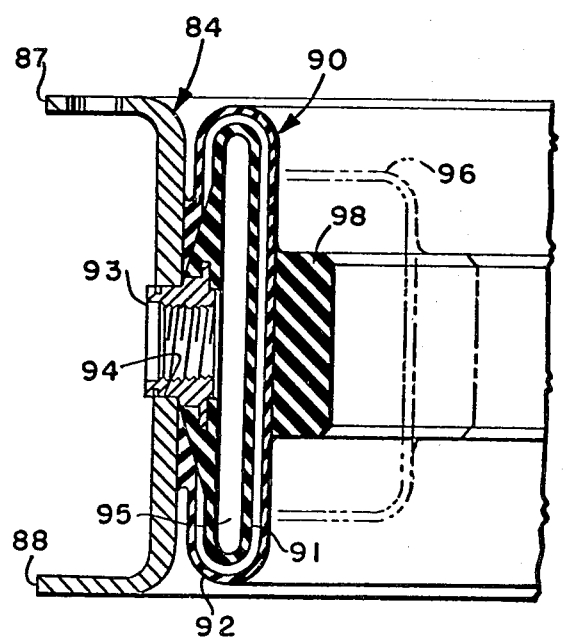
FIG. 4 is an enlarged fragmentary vertical section through the fluid expandable ring grip of the tire loader of FIG. 3.

Referring now in particular to FIGS. 2-4, it will be seen that the fluid expandable ring grip 57 includes an annular channel support or ring 84 which is secured by interconnected, top and bottom gusset plates 85 and 86 to and in horizontal line with the distal end of the loader arm 58. As shown, the gusset plates 85 and 86 extend arcuately about an approximately semicircular portion of the support ring 84, the radially outwardly extending top and bottom flanges 87 and 88 of which respectively lie above and below the top and bottom gusset plates for securement thereto by fasteners 89. As can be seen in FIGS. 1 and 3, the support ring 84 and loader arm 58 have a relatively low or narrow profile, such having a height on the order of the tread width of the green tire T.

As best seen in FIG. 4, a double walled, tubular annulus or bladder 90 is secured to the support ring 84 at its radially inner annular surface. The inner wall 91 and outer wall 92 of the bladder 90 are annularly closed upon themselves and essentially form inner and outer tubes. The noted securement to the support ring 84 is effected by a plurality of circumferentially arranged inserts or fittings. A representative fitting is shown at 93, and it can be seen that the radially inner end thereof is embedded in the radially outer wall of the bladder 90 whereas its radially outer end extends radially through a locating hole 94 in the support ring 84. The insert 93 is internally threaded for coupling to a suitable supply line which provides for introduction and exhausting of fluid such as air into and out of the inner annular chamber 95 formed by the inner bladder wall 91 for inflating (expanding) and deflating (contracting) the bladder 90. When inflated, the bladder distends radially inwardly from the deflated condition thereof seen in solid lines in FIG. 4 to the phantom line inflated condition indicated at 96.

As will be appreciated, such inflation and deflation of the bladder 90 effects radial movement of an annular array of radially inwardly projecting tread gripping ribs or blocks 98 secured such as by bonding to the radially inner wall portion of the bladder 90. As seen in FIG. 2, the blocks 98 extend all the way around the inner periphery of the bladder and preferably are circumferentially equally spaced apart a relatively short distance. The blocks generally have a rectilinear shape such that they provide an essentially planar, tread engaging surface at their radially inner ends. It is noted that the disclosed bladder and block construction is similar to the tube element employed in the tire building machine component carrier disclosed in Collins et al U.S. Pat. No. 4,148,681.

The particular dimensions of the support ring 84 and bladder 90 will depend principally on the sizes of green tires to be handled by the loader 54. The inner diameter of the bladder 90 when deflated, or more accurately that of the gripping blocks 98 ringing the radially inner periphery thereof, necessarily must be greater than the outer diameter of the green tire at the tread thereof in order to allow the bladder to be lowered axially around the tread of the green tire that may be supported on the loader stand 55 in front of the press. On the other hand, the bladder upon inflation must be capable of sufficient radial distension to bring the tread engaging surfaces of the gripping blocks 98 into collective holding or grasping engagement with the tread of the green tire.

In order properly axially to position the inflatable ring grip 57 in relation to the green tire tread as it is lowered thereabout, a tire detect assembly seen at 100 in FIG. 3 desirably is provided. The assembly 100 includes a control switch 101 mounted on top of the support ring 84 with an actuator arm 102 thereof projecting radially and axially inwardly for engagement with the upper shoulder of the green tire tread as the ring grip is lowered around the green tire T. When the switch detects the green tire inside the ring grip, lowering of the ring grip is halted and the bladder then inflated to effect substantially continuous grasping and holding of the outside of the tread of the green tire by the gripping blocks 98. As the gripping block 98 uniformly radially move inwardly to grasp the green tire tread, such will cause the green tire to be axially centered with respect to the tread grip. Thereafter, the green tire is removed from the loader stand as by elevation of the tread grip to the phantom line position indicated at 104 in FIG. 1 and then transferred horizontally into the press for subsequent positioning in the manner more particularly described hereinafter, it being noted that the bead areas of the tire are both free for subsequent centering, registering and/or seating operations.

III. The Press Head

Figure 5:
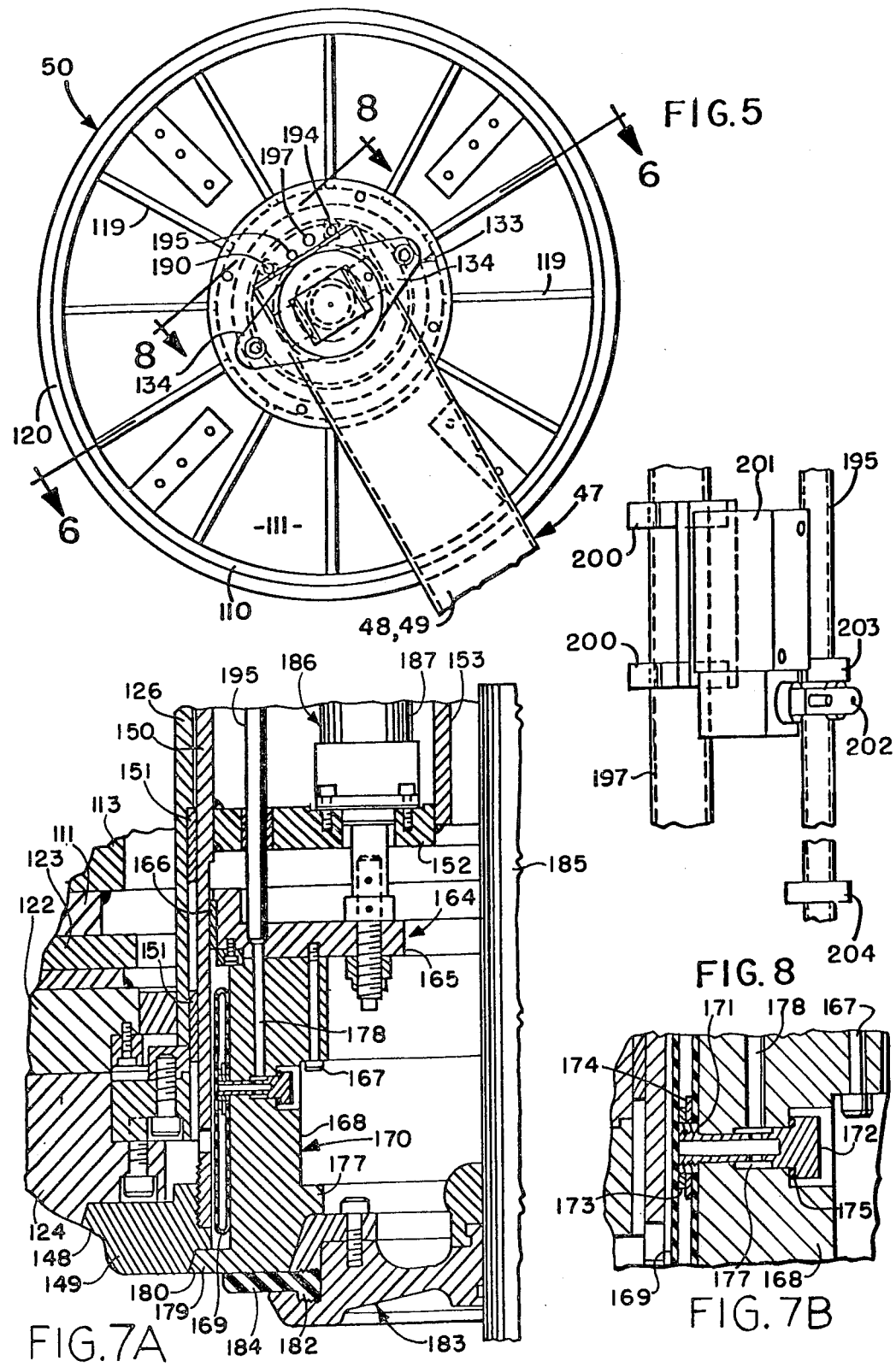
FIG. 5 is an enlarged top plan view of one cavity of the press seen in FIGS. 1 and 2.
Figure 6:
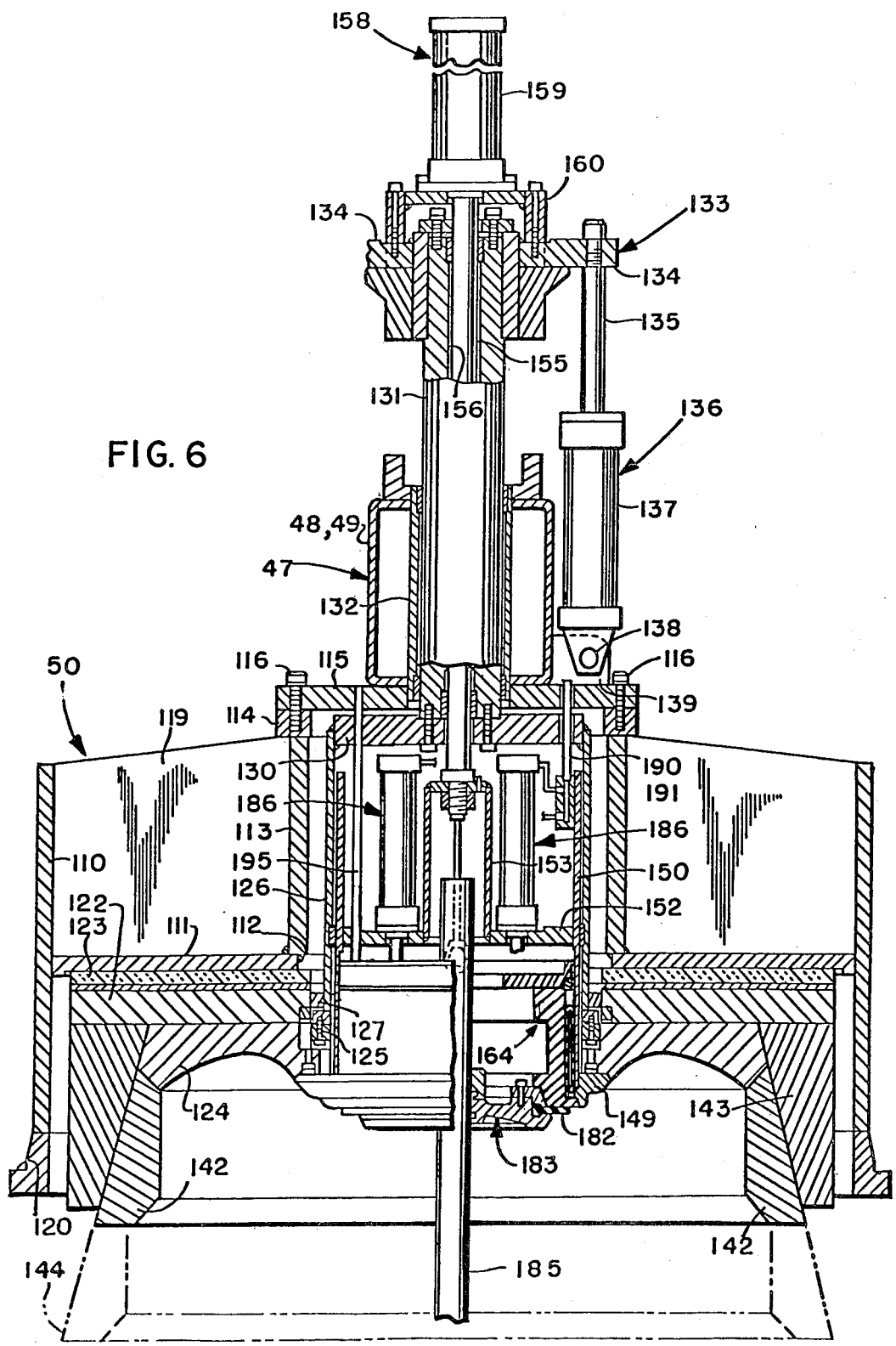
FIG. 6 is an enlarged fragmentary vertical section through the upper half of the press cavity of FIG. 5 taken substantially along the line 6—6 thereof.

Reference now being had to FIGS. 5-8, the component structure of each press head 50 will be described. As seen in FIGS. 5 and 6, the press head 50 includes a cylindrical shell 110 which is provided with a transverse plate 111 having a central hole 112. Secured to the transverse plate 111 along the inner peripheral edge thereof is an upwardly extending cylinder or can 113 which has at its top end a bolster ring or flange 114 secured to the underside of a bolster plate 115 by fasteners 116. In this manner, the press head is supported beneath the distal end of the respective arm 48,49 of the yoke 47, it being noted that the bolster plate 115 is welded or otherwise fixed to the underside of such arm as seen in FIG. 6. As also seen in FIG. 6, the arm 48,49 is a square tube.

The frame structure of the press head 50 also includes a plurality of radially extending gussets 119. The gussets 119 are secured to the outer shell 110, the transverse plate 111 and cylindrical can 113 to form a rigid frame structure. It also is noted that the lower end of the outer shell 110 is provided with an enlarged radially projecting flange 120 formed with alternating teeth and notches. The teeth and notches are designed to cooperate with corresponding notches and teeth in a lock ring employed to secure the press head 50 to the corresponding press base 43 as in the manner disclosed in the aforementioned U.S. Pat. No. 4,332,536.

Continuing with the description of the press head 50, an upper heating platen 122 is secured to the underside of the transverse plate 111 and, as is desired, is insulated from such plate by an insulating plate 123. The platen 122 and supporting structure therefor accordingly provides a rigid backstop for a vertically movable upper mold section or part 124 of a sectional mold mechanism. The upper mold section 124 is secured by an adaptor ring and flange assembly 125 to the bottom end of a sectional mold actuator sleeve or cylinder 126 which may be considered a part of a press head center mechanism that further consists of components described hereinafter. As seen in FIG. 6, the sleeve 126 is accomodated in respective openings in the platen 122, insulating plate 123, transverse plate 111 and the downwardly opening well defined by the can 113 and bolster plate 115. Also, there is provided a bushing 127 interiorly of the platen 122 which serves to guide the sectional mold actuator sleeve 126 during vertical movement thereof in the press head.

The closed end 130 of the sectional mold actuator sleeve 126 is secured to the bottom end of a sectional mold actuator shaft 131 which is guided for vertical movement in a vertical tube 132 extending through the arm of the yoke 47. Mounted on the top end of the actuator shaft 131 is a yoke plate 133 which has short arms 134 extending in opposite directions for connection to the piston rods 135 of respective piston-cylinder assemblies 136, such assemblies constituting sectional mold actuators. Each piston-cylinder assembly 136 extends vertically and has the blind end of its cylinder 137 clevis mounted at 138 to a lug 139 secured to the top of the bolster plate 115. Accordingly, extension and retraction of the sectional mold actuators 136 effects vertical upward and downward movement of the upper mold section 124.

The sectional mold mechanism in the press head 50 also includes a series of tread mold sectors 142 mounted for vertical movement on a steam jacketed wedge ring 143. The wedge ring 143 is secured to the upper platen 122. In a conventional manner, the tread sectors 142 are mounted for sliding movement with dove-tail connections both with respect to the wedge ring 143 and upper mold section 124. As the sectional mold actuator shaft 131 is moved vertically by the sectional mold actuators 136, the upper mold section 124 will move vertically toward and away from the platen 122. This movement causes the tread sectors to move radially from their fully closed position seen in solid lines in FIG. 6 to a fully opened position seen in phantom lines at 144 in FIG. 6. When the press is fully closed, the tread sectors will seat against the upper mold section and also against the lower mold section of the press to define the tire mold cavity. When fully opened, the tread sectors may project substantially below the bottom edge of the upper mold section as well as the outer shell 110.

Referring now in particular to FIGS. 6 and 7, the upper mold section 124 can be seen to have an annular inner recess 148 which accomodates a vertically movable upper bead or toe ring 149 that provides a seat for the upper bead of the tire. The upper bead ring 149 is threaded on the lower end of a cylindrical sleeve 150 that is retained in and guided as by bushings 151 for vertical movement in the sectional mold actuator sleeve 126. The bead ring mounting sleeve 150 is provided with a medially located, transverse ring 152 which is secured at its radially inner peripheral edge to the bottom of a tubular mount 153. The tubular mount 153 is closed at its top end by a plate connected to an actuator rod 155 which extends upwardly through a center bore 156 in the sectional mold actuator shaft 131. The actuator rod 155 is connected at its top end to the piston of a vertical piston-cylinder assembly 158, the cylinder 159 of which is mounted on top of the sectional mold actuator yoke plate 133 by a platform support assembly 160. The assembly 158 accordingly constitutes an upper bead ring actuator.

When the piston-cylinder assembly 158 is retracted, the upper bead ring 149 will be held seated or registered in the recess 148 of the upper mold section 124 and further will move along therewith during actuation of the sectional mold mechanism. Extension of the piston-cylinder assembly 158, however, will move the upper bead ring downwardly away from the top mold section and, as will be seen below, to a position below the vertical extent of tread sectors 142 when such sectors are in their fully opened condition 144.

Still referring to FIGS. 6 and 7, the press head 50 or center mechanism thereof also can be seen to include a green tire bead elevator 164 which is retained for telescopic movement in the upper bead ring mounting sleeve 150. The bead elevator 164 at its upper end includes a transverse ring 165 which has a bushing 166 secured around its radially outer periphery for sliding vertical movement on the inside surface of the upper bead ring mounting sleeve 150. Removably secured to the underside of the transverse ring 165 by fasteners 167 is a thick-walled cylindrical hub or skirt 168 which is coaxial with the upper bead ring 149. Secured to such skirt is a small fluid expandable tubular annulus or bladder 169 of a bladder chuck 170.

The elevator bladder 169 is fully contour molded into an annular tube and includes at least one but preferably a plurality of molded-in inserts 171 circumferentially spaced in line around the inner diameter of the tube. Each insert has an internally threaded radial bore for securement and positioning of the bladder to the O.D. of the skirt 168 by respective fittings 172. Each insert also has a peripheral projecting flange 173 which overlies a belt or band 174 that may be molded in the tube during the forming process. The flange serves to prevent pull-out of the insert while the band restrains the bladder when inflated to maintain a portion of the inner wall against the O.D. of the skirt. Normally the bladder would tend to come to a circular shape on the center line of the inserts; however, with the restraining band, the inflation of the bladder can be controlled for desired bladder action.

As shown, the inner diameter of the skirt 168 is counterbored to provide a recessed flat chordal mounting surface against which the head of a respective fitting is sealed by a sealing washer 175. The shank 176 of each fitting extends through a radial bore and into threaded engagement with the insert at its threaded distal end. The shank and bore are diametrically stepped in radially offset relation as shown to provide an enclosed space 177 open to an axially upwardly extending fluid supply passage 178. Each shank also includes a longitudinal bore opening at its outer end to the interior of the bladder and at its other end to the closed space 177 by means of transverse bores in the shank. Accordingly, the fitting in addition to locating and securing the bladder to the skirt provides fluid communication between the bladder cavity and supply passage 178.

The elevator bladder 169 preferably is pre-shaped so that when contracted as seen in FIGS. 6 and 7, it closely hugs the annular skirt 168. As can be seen in FIG. 7, the radially outer surface of the skirt is sufficiently radially inwardly spaced from the radially inner wall of the bead ring mounting sleeve 150 to accomodate therebetween the contracted annulus 169 when the elevator 164 is fully retracted into and housed in the bead ring mounting sleeve 150. When thus retracted, it can be seen that an annular pilot or centering flange 179 extending radially outwardly at the bottom of the skirt 168 nests or registers at mating pilot surfaces in a radially inner annular recess 180 in the upper bead ring 149. In this manner, the centering ring closes the storage area for the elevator bladder with respect to the interior of the press mold.

The skirt 168 also has at its bottom end a radially inner annular recess 182 into which nests or registers at mating pilot surfaces an annular shoulder on the upper bladder clamp 183 for the shaping and curing bladder 184 of the press. The upper bladder clamp 183 is mounted on a center post 185 of a shaping and curing bladder center mechanism which may be similar to that disclosed in the aforementioned U.S. Pat. No. 4,338,069. It, however, here will be appreciated that the lower end of the skirt 168 serves as a pilot for the upper bladder clamp to insure precise axial alignment between the upper components of the bladder center mechanism and the press head components. As seen in FIG. 7, the upper bladder clamp 183 seats within the skirt which in turn seats within the upper bead ring 149 which in turn seats in the upper mold section 124.

Although the green tire bead elevator 164 is shown in FIGS. 6 and 7 in its retracted condition, the elevator may be telescoped downwardly in relation to the upper bead ring 149 by a pair of piston-cylinder assemblies 186. The cylinders 187 of the assemblies 186 are mounted on top of the transverse ring 152 with the rods thereof extending through such ring for connection to the transverse ring 165 of the elevator. Accordingly, actuation of the piston-cylinder assemblies will move the elevator vertically in relation to the upper bead ring. Otherwise, the elevator will move along with the upper bead ring upon actuation of the upper bead ring actuator 158.

The elevator actuator 186 preferably are of the double-acting type. In FIG. 6, a supply and return line for the top ends of the cylinders 187 is illustrated at 190. The supply line 190 runs to a dividing block 191 which distributes fluid by respective lines to the top ends of the elevator actuator cylinders 187. Of course, another supply and return line is provided for the bottom ends of the cylinders, such being seen at 194 in FIG. 5 along with the relative actual position of the line 190.

Also provided is a bladder supply line which is illustrated at 195 in FIGS. 6 and 7. The bladder supply line 195 is secured at its bottom end to the transverse elevator ring 165 for connection to the passage 178 extending through the skirt 168 as best seen in FIG. 7A. The actual position of such line 195 in relation to the press head, however, is seen in FIG. 5 where it further can be seen that the bladder supply line 195 is located adjacent another line or tube 197. The line 197 is secured to and may open just below the transverse plate 152. As will be appreciated below, such supply line may provide for introduction of pressurized air into the interior of the green tire for bead seating purposes.

As seen in FIG. 8, the tube 197 extends parallel to the bladder supply line 195. Mounted on the tube 197 by collars 200 is a bead elevator stroke limit switch 201. The limit switch 201 has a switch lever 202 which moves vertically between top and bottom stop collars 203 and 204 threaded on the outside diameter of the bladder supply line 195. The collars may be adjusted along the bladder supply line to determine the stroke ends for the bead elevator 164 as the same is moved vertically by the elevator actuators 186 in relation to the upper bead ring 149. It is noted that the bladder supply line moves vertically with the bead elevator whereas the tube 197 moves vertically with the upper bead ring 149.

IV. Operation of the Press

An exemplary operational loading sequence for the press 40 in accordance with the present invention is depicted in FIGS. 20-31. The following constitutes a description of such preferred sequence, it being appreciated, however, that variations in the sequence in certain respects may be made while still obtaining advantages afforded by the present invention.

Before proceeding with the description of the loading sequence, it is noted that additional components of the press 40 are shown in the sequential schematic illustrations. In particular, the lower mold section of the press can be seen at 210 in FIG. 20. Such lower mold section is mounted on a platen 211 which may be hydraulically actuated as in the manner set forth in the aforementioned U.S. Pat. No. 4,332,536. Also schematically shown is the press bladder center mechanism 212 mounted in the lower half of the press as in the manner disclosed in the aforementioned U.S. Pat. No. 4,338,069. The center mechanism 212 can be seen to include a vertically movable well 213 on which the lower bead or toe ring 214 is mounted. The lower bladder clamp for the shaping and curing bladder 184 also can be seen at 215 along with the upper bladder clamp 183.

Figure 20:
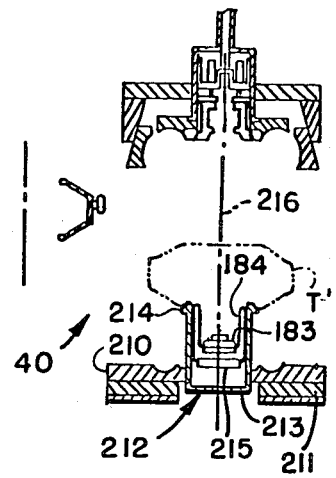
FIGS. 20-31 are sequential schematic illustrations showing another examplary sequence of operations according to the invention for a press of the type seen in FIGS. 1-8.

Turning now to the description of the press operation, FIG. 20 shows the press 40 fully opened with the lower bead ring 214 raised above the lower mold section 210. The illustrated condition of the press generally corresponds to that occurring just after a cured tire has been unloaded from the press. As also seen in FIG. 20, the ring grip 57 already is holding therein a green tire T which it has lifted from a loader stand in front of the press.

Figure 21:
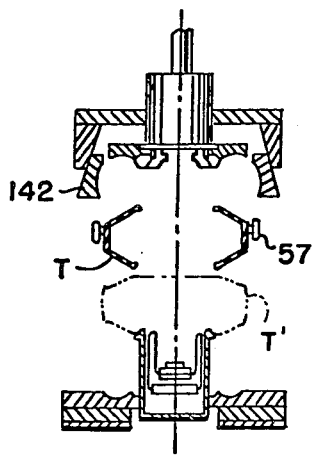
Figure 22:
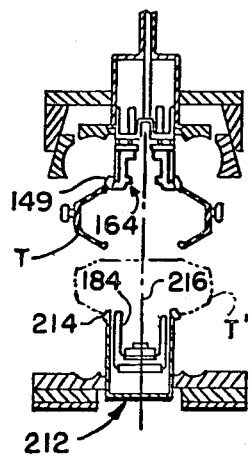

At this point, the ring grip 57 is swung into the press to bring the green tire T into axial alignment with the press axis 216 as seen in FIG. 21. As this is done, the top bead of the green tire may pass just under the tread sectors 142 of the segmented mold. Alternatively, tread ring grip may be swung into the press at a lower elevation as depicted in FIG. 1 (moving from position 104 to position 217) and, once in axial alignment with the mold sections, elevated to the position seen in FIG. 21 and at 218 in FIG. 1. The upper bead ring 149 and bead elevator 164 then are lowered to position the upper bead ring in close proximity to the top bead of the green tire as seen in FIG. 22. Once the FIG. 22 position is reached, lowering of the upper bead ring is halted while the elevator continues to move downwardly and into the green tire so as to position the bladder chuck 170 thereof below the upper bead ring and top bead of the green tire T as seen in FIG. 23.

Figure 23:
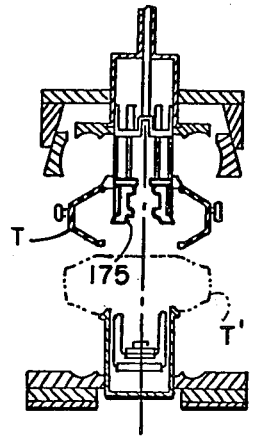
Figure 24:
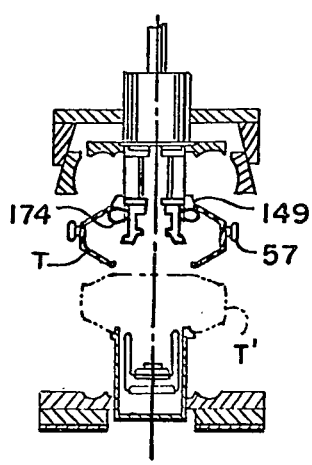

When the FIG. 23 condition is reached, the elevator bladder 169 is expanded as by air inflation to its expanded donut shape and slightly axially shifted upwardly by the actuators 186 to engage the underside of the top bead of the green tire T. When fully expanded and axially shifted as seen in FIG. 24, the annular bladder will bring the top bead of the green tire into registered contact with the upper bead ring 149 and then continue to serve as a resilient annular shelf for maintaining such registered contact during subsequent positioning of the green tire in the following manner. At this time, the green tire now held by the elevator is released from the ring grip 57 to effect transfer of the green tire to the press head.

Figure 25:
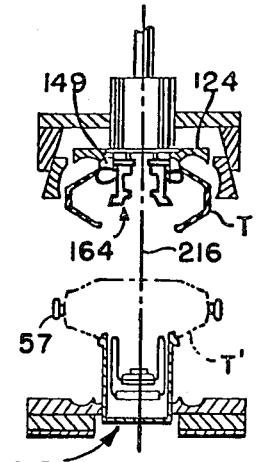
Figure 26:
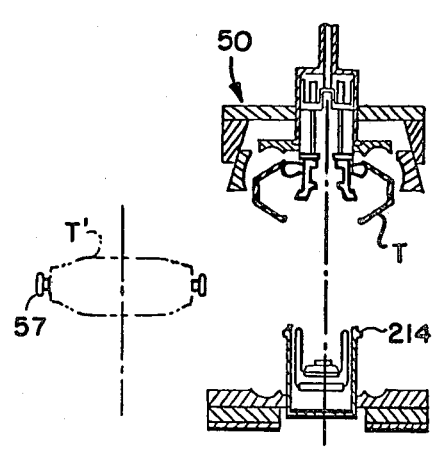
Figure 27:
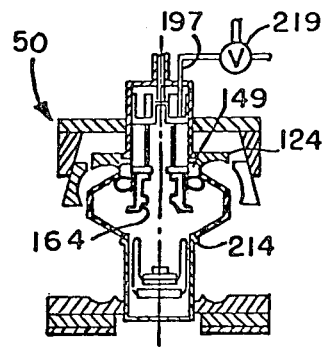

Moving on to FIG. 25, the green tire T then is raised to the upper mold section 124 upon uniform upward vertical movement of the upper bead ring 149 and bead elevator 164. Such elevation continues until the upper bead ring registers in the upper mold section 124. At this point, the bottom bead of the green tire is axially clear of the ring grip 57 which then is swung clear of the press as seen in FIG. 26.

With the ring grip 57 clear of the press, the press partially closes, i.e., the press head 50 is lowered, to position the bottom bead of the green tire T on or close to the elevated lower bead ring 214. Once the FIG. 27 position is reached, pressurized air may be admitted through the supply line or tube 197 as by means of a three-way supply valve 218 into the interior of the green tire. As the green tire inflates, the beads will move apart and firmly seat themselves with a snap action on the respective bead rings. It perhaps should be noted here that the center mechanisms in the press head and base necessarily are sufficiently sealed or sealingly contained in respective wells to define an essentially sealed chamber in the press along with the green tire to permit such green tire inflation and bead seating.

Figure 28:
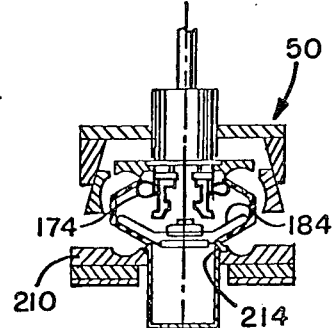

With the green tire beads fully and firmly seated on the bead rings, the press head 50 and lower bead ring 214 are uniformly lowered until the lower bead ring registers with the lower mold section 210 as seen in FIG. 28. As this occurs, the shaping and curing bladder 184 will fall into the interior of the green tire. If desired, inflation of the green tire and bead seating may be delayed until the FIG. 28 condition is reached whereupon the bladder laying on the bottom bead of the green tire will tend to hold such bottom bead in registered contact with the lower bead ring.

Figure 29:
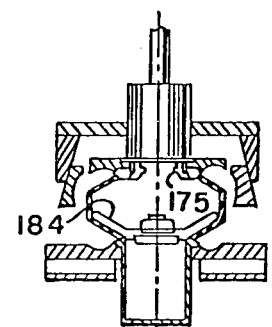
Figure 30:
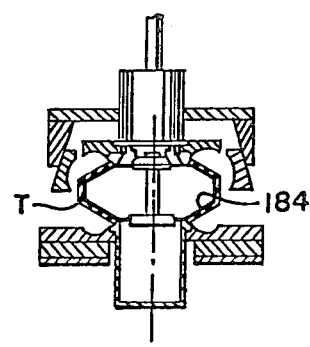
Figure 31:
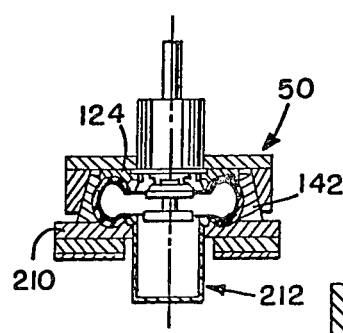

With the green tire T now firmly held between the bead rings and accurately located by such bead rings in relation to the mold cavity, the elevator bladder 169 may be deflated and the bladder chuck 170 retracted into the storage area provided in the press head as seen in FIG. 29. In addition, air within the green tire may be exhausted and initial inflation of the shaping and curing bladder 184 effected under modest pressure to fill out to its toroidal shape depicted in FIG. 30. After initial shaping of the green tire, the press now finally closes as seen in FIG. 31. Upon full closure, full shaping pressure may then be applied to the interior of the bladder 184 for final shaping and cure of the tire.

As an alternative to air inflating the beads onto the bead seats as aforedescribed, the bladder chuck 170 may be utilized to seat the top bead of the green tire onto the upper bead seat prior to the shaping operation. After the bladder chuck has brought the top bead into registered contact with the upper bead seat, the bladder chuck can further be elevated by the actuators 186 to firmly seat the top bead on the upper bead seat. It is noted here that the expanded bladder at its radially outer top portion essentially presents a tapered surface coaxial with the upper bead ring which serves to align, center and circularize the top bead for proper seating on the upper bead seat.

With the top bead held fully seated on the upper bead seat, the press head 50 may be partially lowered to position the bottom bead of the green tire on or close to the elevated lower bead ring 214. The shaping and curing bladder then may be inserted as seen in FIG. 28 so that the bladder lays on the bottom bead of the green tire which will tend to hold such bottom bead in registered contact with the lower bead ring. Full shaping pressure may then be applied to the interior of the bladder for seating of the bottom bead and final shaping and cure of the tire as the press closes thereabout. As the shaping bladder expands, it progressively engages the interior of the tire going from the bottom bead to the top bead.

Further with reference to FIGS. 20–31, it will be seen that the loader also may be used as an unloader to remove a previously cured tire from the press in sequence with the green tire loading operation. Instead of removing the cured tire from the press prior to introduction of the green tire in the press, the cured tire may be left in the press during the initial loading sequence illustrated in FIGS. 20–24. For example, the cured tire may remain supported atop the bottom toe ring as seen in phantom lines at T'. Although the bottom toe ring has already been moved to its elevated position in FIGS. 20–24, it alternatively may be maintained in a lower position to facilitate clearance between the cured tire T' supported thereon and the green tire T being introduced into the press by the ring grip 57.

After the green tire has been released from the ring grip 57 and transferred to the press head as seen in FIG. 25, the ring grip, instead of being immediately withdrawn from the press, is lowered about the cured tire T' and operated to grip the cured tire at its tread. The cured tire then may be raised to clear the lower bead seat and finally swung clear of the press as seen in FIG. 26. At this point, the cured tire may be deposited, for example, on a conveyor located in front of the press to one side of the loader stand.

V. Operation of a Post-in-Well Type Press

Figure 9:
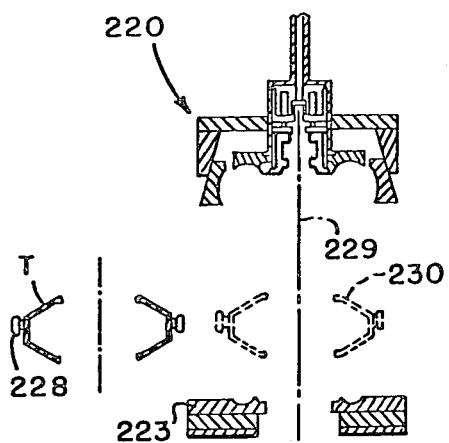
FIGS. 9-19 are sequential schematic illustrations showing an exemplary sequence of operations according to the invention for a press of the post-in-well type.
Figure 10:
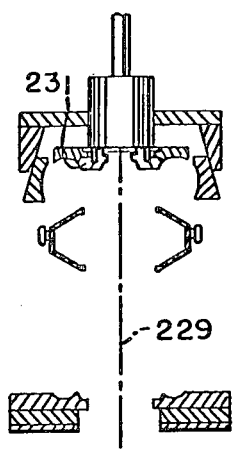
Figure 13:
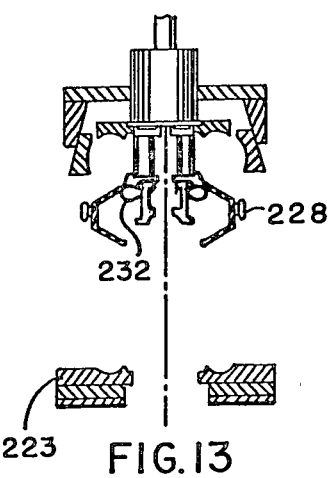
Figure 14:
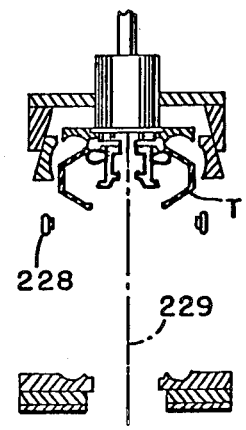
Figure 15:
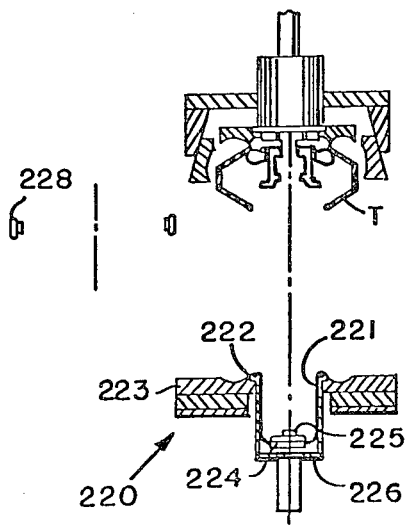

Referring now to FIGS. 9–19, an exemplary operational loading sequence of a post-in-well type press 220 is depicted. The significant illustrated difference between this type of press and the aforedescribed press 40 is that the lower bead of the shaping and curing bladder 221 is fixed in relation to the lower bead ring 222 of the press mold (as seen in FIG. 15) which remains in registry with the lower mold section 223 during the loading operation. On the other hand, the upper bladder clamp 224 is mounted on a center post 225 for vertical manipulation of the bladder initially housed within the press well 226 during bladder insertion, shaping and stripping operations. In FIG. 9, the press 220 is shown in its fully opened condition. Forwardly of the press or to the left in FIG. 9, it can be seen that a green tire T is already held by the ring grip here designated by reference numeral 228.

From this initial condition, the ring grip 228 may be swung into the press 220 to bring the green tire T in axial alignment with the press axis 229 as seen in phantom lines at 230 in FIG. 9. Once the green tire is thus aligned, the ring grip is raised to position the green tire within reach of the upper bead ring 231 as seen in FIG.

Figure 11:
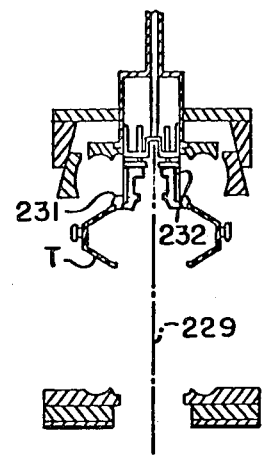

10. At this point, the upper bead ring and bead elevator 232 together may be moved downwardly to locate the bead ring in close proximity to the top bead of the green tire as seen in FIG. 11.

Figure 12:
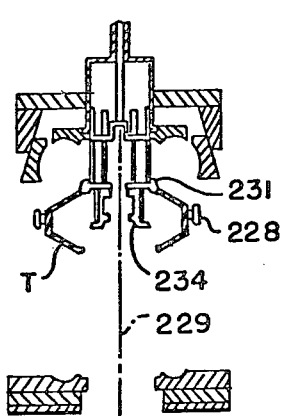

Moving on to FIG. 12, the elevator 232 continues to move downwardly to position the bladder chuck 234 at the lower end thereof below the upper bead ring 231 and top bead of the green tire T. The bladder chuck is then inflated and slightly shifted axially upwardly, the bladder 232 thereof expanding radially outwardly and then moving upwardly into engagement with the underside of the top bead of the green tire. Upon full inflation of the bladder, the top bead of the green tire will be brought into registered contact with the upper bead ring as seen in FIG. 13.

While such registered contact is maintained, the green tire T is released from the ring grip 228 and raised to the upper mold section until the upper bead ring 231 is brought into registry with the upper mold section 235 as seen in FIG. 14. At this point, the bottom bead of the green tire will clear the ring grip which then is swung clear of the press as seen in FIG. 15.

Figure 16:
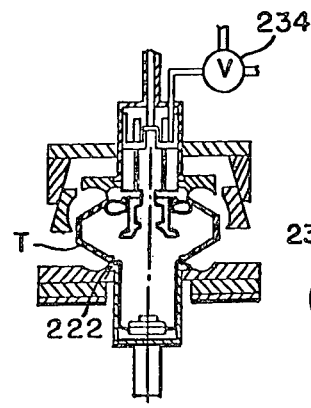
Figure 17:
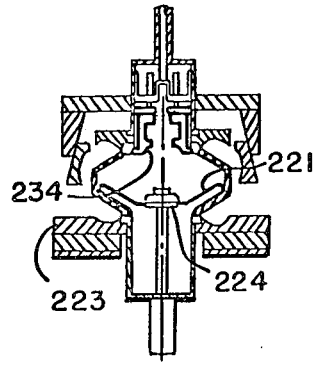
Figure 18:
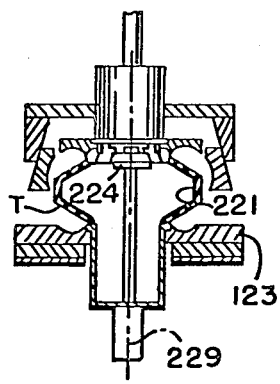

With the ring grip 228 clear of the press, the press may then be partially closed to position the bottom bead of the green tire T on or close to the bottom bead ring 222 as seen in FIG. 16. Pressurized air may then be introduced into the interior of the green tire as by the valve 234 to inflate the green tire. Alternatively, the inflation may be delayed until the bladder clamp 224 has been raised into the bottom of the tire and the shaping and curing bladder 221 slightly swelled over the bottom bead of the green tire as seen in FIG. 17 so that the bladder 221 serves to hold the bottom bead in registered contact with the lower bead seat as the green tire is inflated.

Figure 19:
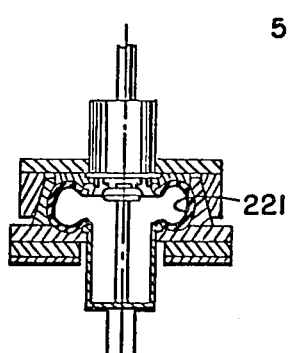

As the green tire inflates, the beads will move apart and snap onto the bead rings. Once the green tire beads are seated, the elevator bladder chuck 234 is deflated and retracted into the press head as seen in FIG. 17. In addition, air within the green tire may be exhausted through the valve 234, the upper bladder clamp 224 raised and the shaping and curing bladder 221 inflated under modest pressure to fill out to its toroidal shape seen in FIG. 18. At this point, the press may then be finally closed as seen in FIG. 19 and high pressure fluid admitted to the interior of the bladder 221 for final shaping and cure of the tire.

As will be appreciated, the previously described modifications to the loading sequence shown in FIGS. 20-31 may also be made to the loading sequence shown in FIGS. 9-19. That is, the bladder chuck may be utilized to fully seat the top bead of the green tire on the upper bead seat while the bottom bead is seated on the lower bead seat by the shaping bladder or other means than air inflation. Also, the loader may be used to remove the cured tire from the press in sequence with the green tire loading operation. In the latter instance, the green tire would be swung into the press at a higher elevation than that shown in FIG. 9 in order to clear a cured tire supported on the bottom toe ring.

VI. Operation of a Bladder-in-Well Type Press

Figure 32:
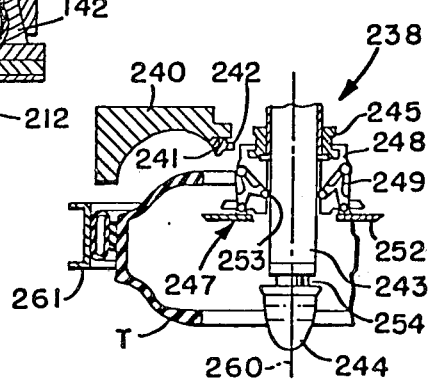
FIGS. 32-34 are sequential schematic illustrations showing exemplary operational sequences according to the invention for a press of the bladder-in-well type.
Figure 33:
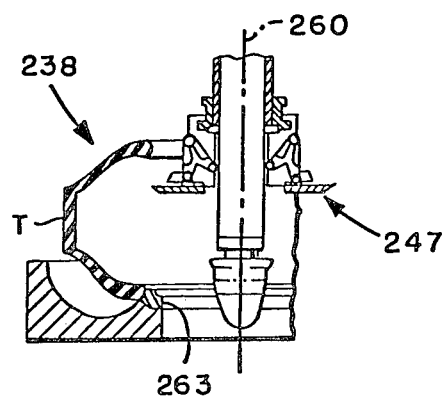
Figure 34:
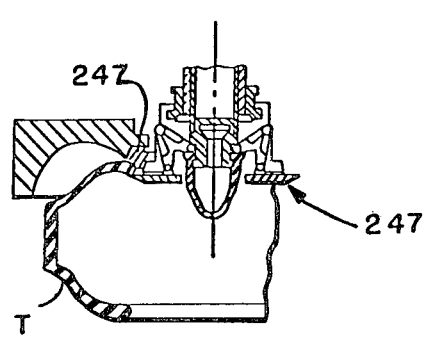

In FIGS. 32-34, an operational sequence showing application of the present invention to a bladder-in-well type press 238 is shown. Only the components of the press 238 necessary to an understanding of the application of the invention thereto as shown. It is noted, however, that the overall press design may be that of a widely known "Autoform" tire press manufactured and sold by the NRM Corporation of Akron, Ohio. Reference may be had to Turk et al U.S. Pat. No. 3,378,882 and Mallory et al U.S. Pat. No. 3,097,394 for details of this type of press.

As seen in FIG. 32, the upper mold section 240 is provided with an annular recess 241 for the upper bead ring 242. As is conventional, the top mold section is carried by the press head which has mounted therein, concentric with the upper mold section, a vertically movable bladder ram 243 having a hemispherical nose 244 at the lower end thereof. The bladder ram passes through a green tire bead elevator sleeve 245 which also is mounted for vertical movement in the press head independently of the ram. The ram and sleeve are of course provided with respective actuators for effecting required vertical movement thereof.

Secured to the lower end of the elevator sleeve 245 is a mechanical elevator chuck 247 including four quadrant spaced web members 248 to which respective bell cranks 249 are pivoted. The lower leg of each bell crank 249 is connected to a respective chuck sector plate 252 whereas the upper leg of each bell crank is provided with a roller 253 which can fit within an annular recess 254 (as seen in FIG. 34) formed between the ram nose 244 and a shoulder on the ram 243. Accordingly, movement of the ram controls pivotal movement of the bell cranks which in turn control radial movement of the sector plates. The sector plates thus together define an expandable plate-like chuck which may be radially expanded and contracted. For illustrations of similar mechanical chucks that may be employed, reference may be had to the aforementioned U.S. Pat. Nos. 3,378,882 and 3,097,394.

At the beginning of a loading sequence, the press head of the indicated type of press initially will be slid back relative to the base or lower press half. As the press closes, the press head first moves horizontally to a position vertically above the lower press half and then vertically downwardly for final closure.

Before or while the press starts to close, a green tire T may be introduced and held by a loader in axial alignment with the press axis 260. As seen in FIG. 32, the tire may be held by the aforedescribed ring grip here indicated at 261. With the green tire thus held, the press may start or continue to close, the press head moving forwardly and then downwardly (in the case of a slideback press) to a position just above the green tire. Also, the elevator chuck 247 is moved downwardly into the green tire and the sector plates 252 expanded underneath the top bead of the green tire as seen in FIG. 32.

As seen in FIG. 33, the green tire T alternatively may be introduced into the press and set at its bottom bead on the lower bead ring 263 of the press mold. The press then may be partially closed and the elevator chuck 247 moved downwardly into the green tire and expanded beneath the top bead of the green tire.

From either the FIG. 32 or FIG. 33 conditions, the elevator chuck 247 then is elevated to bring the top bead of the green tire T into registered contact with the upper bead ring 242 as seen in FIG. 34. Thereafter, the press head, which first may be elevated, if necessary, to allow withdrawal of the ring grip 261 from the press, is further lowered to position the bottom bead of the green tire on or in close proximity to the lower bead ring 263. At this point, pressurized air may be introduced into the interior of the green tire to inflate the same. As the green tire inflates, the beads thereof will move apart and snap on the respective bead seats. With the beads firmly seated and the green tire held between the bead rings, the elevator chuck 247 is collapsed and retracted into the press head and out of the way for bladder insertion and shaping and final closure of the press.

As will be appreciated, the operational sequence of FIGS. 32–34 also may be modified in a manner similar to that described in connection with the operational sequences shown in FIGS. 9–19 and 20–31. The elevator chuck 247 may be utilized to seat the top bead of the green tire on the upper bead ring 242 and/or the loader may be utilized to effect removal of the cured tire from the press after transfer of the green tire to the press head.

It thus can be appreciated from the foregoing that the present invention provides a tire loading and/or unloading system that has advantageous application in bladder-type presses of various types. Such system provides for efficient introduction of green tires into the press through a process of green tire positioning, transfer and locating, as well as for sequential withdrawal of cured tires from the press. In addition, there is provided a novel press loader that advantageously may be employed in the foregoing as well as other press loading (and unloading) operations. Principles of this invention may also have advantageous application in presses of the bladderless type.

Although the invention has been shown and described with respect to preferred embodiments, it is obvious that equivalent alterations and modifications will occur to others still in the art upon the reading and understanding of this specification. The present invention includes all such equivalent alterations and modifications, and is limited only by the scope of the following claims.

The embodiments of the invention in which an exclusive property or privilege is claimed are defined as follows:

1. A tire press comprising upper and lower mold parts including respective bead seats, means vertically to separate the mold parts for opening the press, loader means to position a green tire between said mold parts when open, means to transfer the green tire from the loader means to the press with the upper bead secured against the upper bead seat, and means partially to close the press after the loader means has released the green tire and cleared the mold parts to bring the lower bead of the green tire into contact with the lower bead seat, and means to shape the green tire and finally close the press.

2. A tire press as set forth in claim 1 including means to move said loader means vertically after positioning a green tire between said mold parts.

3. A tire press as set forth in claim 1 wherein said loader means comprises an inflatable band substantially continuously gripping the green tire on the outside of the tread.

4. A tire press as set forth in claim 1 wherein said means to transfer comprises a tire bead grip in the upper mold part.

5. A tire press as set forth in claim 4 including means to move said tire bead grip axially of said upper mold part.

6. A tire press as set forth in claim 5 including a bead chuck on said grip operative to expand when said grip is extended.

7. A tire press as set forth in claim 6 wherein said chuck comprises radially movable plates.

8. A tire press as set forth in claim 6 wherein said chuck comprises an inflatable bladder.

9. A tire press as set forth in claim 6 wherein said tire bead grip is retractable into a storage area located interiorly of said upper mold part.

10. A tire press and loader assembly comprising upper and lower mold parts including respective bead seats, means vertically to separate and close the mold parts to open and close the press, loader means operative to position a green tire between and in axial alignment with said mold parts when the press is open and to hold the green tire with the top bead thereof in close proximity to the upper bead seat, means then to engage and hold the top bead of the green tire against the upper bead seat while the press is partially closed to bring the bottom bead of the green tire in register against the lower bead seat, said loader means being further operable to release the green tire and clear the press before such partial closure, and means then to bladder shape the green tire as the press finally closes.

11. An assembly as set forth in claim 10 wherein said means to engage and hold includes a green tire top bead elevator mounted in the press for vertical movement towards and away from the upper mold part.

12. An assembly as set forth in claim 11 wherein said upper bead seat is in the form of an upper bead ring mounted in the press for vertical movement towards and away from the upper mold section, and means are provided to move said upper bead ring and bead elevator to a position beneath the upper mold section for engagement with the top bead of the green tire and then uniformly to elevate said upper bead ring and elevator to raise the then engaged green tire to the upper mold part.

13. A press as set forth in claim 11 wherein said lower and upper mold parts respectively are supported on a press base and movable press head, and said bead elevator includes chuck means mounted for vertical movement in said press head.

14. A press as set forth in claim 13 wherein said loader means first horizontally moves the green tire into axial alignment with the mold parts and then vertically moves the green tire to position the top bead thereof in close proximity to the upper bead seat.

15. A press as set forth in claim 14 wherein said bead elevator engages the top bead of the green tire when held by said loader means, and the said loader means releases and axially clears the green tire before moving horizontally to clear the press.

16. A press as set forth in claim 10 wherein said loader means includes ring grip means operative to engage and hold centered therein the tread of a green tire, and means to move said ring grip means to effect such positioning of the green tire in the press.

17. A press as set forth in claim 16 wherein said ring grip means includes a fluid expandable tubular annulus and a radially outer annular support therefor, said annulus, upon expansion, being operative to engage and grip the tread of the green tire and, upon contraction, being operative to release the green tire tread.

18. A press as set forth in claim 17 wherein said ring grip means is mounted on an elevator, and said elevator is mounted on a loader frame for both horizontal swinging and vertical movement.

19. A press as set forth in claim 10 wherein said loader means, after releasing the green tire, moves vertically downwardly to engage a cured tire supported above the lower mold part and then horizontally to remove the cured tire from the press.

20. A tire loader and press assembly comprising upper and lower mold parts including respective bead seats, means vertically to separate and close the mold parts for opening and closing the press, loader means operative to position a green tire between and in axial alignment with such mold parts when the press is open, means vertically to move the green tire to position the top bead thereof against the upper bead seat and to hold such top bead thereagainst while the press is partially closed to bring the bottom bead of the green tire against the lower bead seat, and means then to bladder shape the green tire while the press finally closes.

21. A tire press loader comprising means to grip a green tire at the tread and place the same in axial alignment with the upper and lower mold sections of a tire press, means to move said green tire when thus aligned toward the upper mold section for engagement by the head of the press, and means to disengage the loader from the tire and clear the tire axially and then the mold sections of the press for closing.

22. A loader as set forth in claim 21 wherein said means to grip includes a fluid expandable annular tubular bladder operative upon expansion to grip the tread of a green tire disposed centrally thereof and upon contraction to release the tread.

23. A tire loader operative to introduce a green tire into a tire press, comprising a tread grip and means to move said tread grip from a green tire pick-up position to a load position in the press, said tread grip including a fluid expandable tubular annulus and an annular support for said annulus, said annulus, upon expansion, being operative to engage and grip the tread of a green tire disposed centrally thereof and, upon contraction, being operative to release the tread.

24. A loader as set forth in claim 23 wherein said annulus includes a fluid expandable annular bladder having a radially inner wall portion and a radially outer wall portion supported by an annular inner peripheral surface of said annular support, and a plurality of gripper means supported in an annular array on said radially inner wall portion of said bladder, said annular array decreasing in diameter upon expansion of said bladder for engaging and gripping the tread and increasing in diameter upon contraction of said bladder to release the tread.

25. A loader as set forth in claim 24 wherein said means for moving includes a vertically and horizontally movable loader frame, and means for mounting said tread grip on said frame.

26. A loader as set forth in claim 23 wherein said means to move includes means vertically to lower the tread grip around the tread of the green tire, and green tire detect means are provided on said tread grip to indicate when the tread of the green tire is disposed within the tubular annulus.

27. A loader as set forth in claim 26 wherein said detect means includes a switch mounted on said annular support and trip means for said switch operative to engage the tread shoulder of the green tire as the tread grip is lowered thereabout.

28. A method of loading and shaping a green tire in a tire press for final shaping and vulcanizing comprising the steps of:
(a) using a loader to position the green tire in axial alignment with the lower mold section of the press;
(b) then securing the green tire to the press head with the top bead held against the upper bead seat;
(c) then withdrawing the loader from the press after releasing the green tire;
(d) then lowering the press head while thus holding such top bead to bring the bottom bead of the green tire against the lower bead seat; and
(e) then bladder shaping the green tire as the press finally closes.

29. A method as set forth in claim 28 wherein the tire loader first positions the green tire between and in axially alignment with the upper and lower mold parts and then elevates the green tire to position the top bead thereof at the upper bead seat for engagement by the press head.

30. A method as set forth in claim 28 wherein a tread grip holds the green tire until engaged by the press head and then releases and axially clears the green tire before moving clear of the press.

31. A method as set forth in claim 28 wherein the tread grip, after releasing the green tire, moves axially to engage a cured tire and then horizontally to remove the cured tire from the press.

32. A method as set forth in claim 28 wherein the top bead of the green tire is engaged and brought into registered contact with the upper bead seat by an elevator chuck mounted for vertical movement in the press head.

33. A method as set forth in claim 32 wherein the upper bead seat and elevator chuck uniformly move upwardly to raise the green tire to the upper mold part before the press closes to bring the bottom bead of the green tire against the lower bead seat.

34. A method as set forth in claim 33 wherein during such upward movement of the upper bead seat and elevator chuck, the green tire is caused to clear axially the tread grip for horizontal shifting thereof out of the press.

35. A method of loading a green tire into a tire press having upper and lower mold sections and respective bead rings for final shaping and vulcanizing comprising the steps of:
(a) positioning the green tire axially between the mold sections when the press is open;
(b) elevating the green tire until the upper bead thereof contacts the bead ring of the upper mold section;
(c) securing the green tire to the upper mold section in such elevated position;
(d) then lowering the upper mold section in axial alignment with the bottom mold section until the bottom bead of the green tire contacts the bead ring of the bottom mold section;
(e) and then bladder shaping the green tire as the press closes.

36. A method as set forth in claim 35 wherein said step of positioning includes engaging the tread of the green tire in a loader tread grip and then moving the tread grip horizontally into the press to position the tire between the mold sections.

37. A method as set forth in claim 36 wherein said step of elevating includes elevating the tread grip when axially aligned with the mold sections until the top bead of the green tire is brought against the upper bead ring.

38. A method as set forth in claim 35 including the step of using a bead elevator in the press head to center and seat the top bead of the green tire on the upper bead ring before the bladder shaping of the green tire is completed.

39. A method of loading and shaping a green tire in a tire press for final shaping and vulcanizing comprising the steps of positioning a green tire between the axially separated mold sections of a press, then elevating the green tire into contact with the top mold section, then lowering the green tire and top mold section while maintaining such contact until the green tire contacts the bottom mold section, and then sealing the green tire beads, shaping the green tire and closing the press.

* * * * *